United States Patent Office 3,473,890
Patented Oct. 21, 1969

3,473,890
PROCESS FOR PRODUCING FINELY-DIVIDED, PRECIPITATED SILICATES AND DOUBLE SILICATES
Helmut Reinhardt, Frankfurt am Main, Peter Nauroth, Wesseling, Bezirk Cologne, and Karl Achenbach, Frankfurt am Main, Germany, assignors to Deutsche Gold- und Silber-Scheideanstalt vormals Roessler, Frankfurt am Main, Germany, a corporation of Germany
No Drawing. Filed July 26, 1966, Ser. No. 567,849
Claims priority, application Germany, Aug. 26, 1965, D 48,056
Int. Cl. C01b 33/24
U.S. Cl. 23—110
7 Claims

ABSTRACT OF THE DISCLOSURE

The production of finely-divided precipitated silicates and double silicates by reacting alkali metal silicate solutions with acidified solutions of soluble metals salts at temperatures of approximately 40 to 90° C. while maintaining a pH value of 3 to 8 and adjusting the suspension of precipitated silicate to a final pH of about 4 to 4.5 with mineral acid.

---

This invention relates to a process for producing precipitated finely-divided aluminum and magnesium-aluminum silicates with a large specific surface area by reacting alkali silicate solutions with the solutions of corresponding metal salts which, as highly active adsorption agents, are suitable preferably for albumin-containing liquids.

It is known to use adsorption agents which are capable of swelling, such as silica hydrate, bentonite, montmorillonite or hectorite, frequently in combination with adsorption agents which cannot swell such as kieselguhr, for treating albumin-containing, organic liquids for example for clearing beer or fruit juices. Hereby it is a question of using natural silicates with a relatively small specific surface area (less than 50 square meters per gram), which have a slight adsorption effect for amines or amino acids.

Therefore, according to a known process, the use of active and wide-pored silicas which have been specially precipitated for clearing beer and which have a gel character and specific surfaces of 200 to 400 square meters per gram has been suggested. In order to obtain even more finely-divided and thus more active silicas with primary particles of several meter microns and specific surfaces up to approximately 800 square meters per gram, an older suggestion executes the precipitation in a preferably acid medium by allowing water glass and acid to flow simultaneously into the receiving water with accurate maintenance of the receiver quantities, concentration of the reaction components, reaction period, temperature, and pH value in order to obtain definite surface areas and pore diameters.

During studies of the surface properties of silica powder, it was found that the impurities which occur most frequently in commercially available silicas are the oxides of calcium and magnesium and the trivalent metals, especially aluminum. The presence of alumina ($Al_2O_3$) in silicas leads to the formation of acid surface areas and a subsequent increase in the adsorption of amines and amphoteric-acting amino acids, therefore, albumin-like substances which are greater in the case of silica aluminas and impure silicas than in the case of pure solids. This effect is even greater, if the oxides of alkaline earths and of aluminas are present together.

On the basis of said investigation results, a problem therefore arose for the further development of effective adsorption agents, specifically for treating albumin-containing liquids: namely, providing a process for producing finely-divided, precipitated silicates and double silicates by reacting alkali silicate solutions with the solutions of suitable metal salts, in which case precipitated, finely-divided silicates with actually refined specific surface areas are obtained instead of the natural and less active calcium and magnesium silicates like those which exist in clays; acid areas being present in the silica surface with an increased adsorption effect due to the incorporation of aluminum-magnesium or calcium oxide.

The characteristic feature of the invention is considered the fact that the precipitation is executed during agitation in an aqueous receiving medium by combining the alkali silicate solution and the acidified metal salt solution at temperatures of approximately 40 to approximately 90° C. and by maintaining a pH value of approximately 3 to 8, preferably 5 to 6.5 by a suitable control of the feed rate. The precipitation suspension is then treated with mineral acid, e.g., sulfuric acid, and brought to a final pH value of 4.0 to 4.5. Then it is filtered off, rinsed salt-free with water, and the pressed paste is dried at temperatures above 100° C., preferably from 110 to 140° C.

The alkali silicate solutions of this invention include aqueous solutions of lithium, potassium and/or sodium silicate. Sodium silicate solutions are preferred. The metal salt solutions of this invention include all soluble salts of the alkali metals, magnesium, calcium, barium and strontium and the trivalent metals aluminum and boron. The nitrates of these metals, e.g., calcium nitrate may be used; however, the preferred salts are the sulfates of aluminum and magnesium and the chlorides of aluminum magnesium, calcium, strontium and barium. Mineral acids such as HCl, $H_2SO_4$ and $HNO_3$ may be employed. It is preferred to use $H_2SO_4$ when sulfate salt solutions are employed. HCl is preferred when the metal salt solutions predominate in dissolved chloride salts.

The silicates precipitated according to the invention can have specific surface values in a wide range which is between 100 to 800 square meters per gram, measured according to BET. Said silicates are characterized by a good adsorption effect for amines and amino acids due to their acid sites. Thus, with the use of a sodium silicate solution and, for example, an aluminum sulfate solution acidified with sulfuric acid, it is possible to obtain an aluminum oxide-containing silica with approximately 86 percent $SiO_2$ and approximately 2.0 percent $Al_2O_3$, whereby the latter suffices for the formation of sufficiently acid areas in the silica surface.

According to a preferred embodiment of the process according to the invention, precipitation can be executed by the simultaneous addition of the alkali silicate solution and the acidified metal salt solution.

According to another embodiment, the acidified metal salt solution which, for example, can again be aluminum sulfate is used directly as the receiving medium, and the sodium silicate solution is slowly added at 90° C. during agitation with a flat paddle mixer until a pH value of about 6.5 is reached in the suspension. Finally, the suspension is brought to about pH 4 with diluted sulfuric acid and is processed in a known way.

If a mixture of several metal salts, for example, aluminum sulfate with small amounts of magnesium sulfate, is used as a metal salt solution according to the described working method, an oxide-containing silica is obtained as above but with an additional content of MgO, for example, of less than about 1 percent. As described previously, the combination of two metal oxides in the silica surface has an extremely favorable effect on the adsorption capability.

Due to their good adsorption effect for amines and amino acids, the products produced according to the invention are especially suitable for use as clearing and/or stabilizing agents of albumin-containing liquids, for example, fruit juices, beer and especially wines, and do not produce any disturbing aftertaste.

In addition to the aforesaid use, the silicate produced according to the invention can also be used to advantage as a carrier substance for catalysts.

EXAMPLE I 440 liters of water which is at 45° C. is placed in a vessel which holds 1000 liters. Then, at 45° C., 72 liters of sodium silicate solution (density 1.35, molar ratio $Na_2O:SiO_2=1:3.3$ moles, 26.2% $:SiO_2$—content) and a mixture of 20 liters of water, 7.9 liters of aluminum sulfate solution (density 1.28 with 6.85 percent $Al_2O_3$ content) and 5.8 liters sulfuric acid (density 1.84) are fed into the receiving medium within 70 minutes, while a pH value of 5.5 to 6 is maintained in the suspension during precipitation by controlling the admission rate of the acid aluminum sulfate solution.

If both solutions are combined with the receiving medium in the aforesaid amounts, the pH value of the suspension is brought to 4.5 by the addition of a small amount of concentrated sulfuric acid. Then the suspension is filtered off in filter presses in a known way and is rinsed salt-free with water. The pressed paste is dried at 105° C. and is finally ground on a disk attrition mill.

27.8 kilograms of powdered aluminum silicate with the following properties are obtained.

| | | |
|---|---|---|
| $SiO_2$ | Percent | 86.1 |
| $Al_2O_3$ | do | 2.1 |
| Loss on ignition | do | 11.3 |
| Of this, $H_2O$ at 105° C. | do | 4.2 |
| pH value in 4% suspension | do | 7.0 |
| BET surface | square meters per gram | 690 |
| Bulk weight | grams per liter | 250 |

EXAMPLE II 16 liters of aluminum sulfate solution (density 1.01 = 0.27% $Al_2O_3$) and 185 milliliters sulfuric acid (density 1.84 = 98% $H_2SO_4$) are placed in a cylindrical stirring vessel with a capacity of 35 liters.

192 grams $MgSO_4 \cdot 3.5 \, H_2O$ are dissolved in the receiving medium.

Now approximately 10 liters sodium silicate solution (density 1.12 = 10.7% $SiO_2$=content, molar ratio $Na_2O:SiO_2=1:3.30$) are added at 90° C. in approximately 45 minutes during agitation with a flat paddle stirrer until a pH value of 6.5 is reached in the suspension. Finally, the suspension is brought to pH 4.0 with 1:1 diluted sulfuric acid.

After filtering, washing and drying at 105° C. and grinding, 1430 grams of a silicate with the following properties are obtained:

| | | |
|---|---|---|
| $SiO_2$ | Percent | 85.5 |
| $Al_2O_3$ | do | 2.2 |
| MgO | do | 0.5 |
| Loss on ignition | do | 11.0 |
| Of this, $H_2O$ at 105° | do | 4.5 |
| pH value of the 4% suspension | | 7.8 |
| BET surface | square meters per gram | 421 |
| Bulk weight | grams per liter | 230 |

We claim:

1. In the process for producing finely-divided, precipitated silicates and double silicates by reacting alkali metal silicate solutions with solutions of soluble salts of metals selected from the group consisting of aluminum, magnesium, calcium, barium, strontium, and boron, the improvement comprising introducing the alkali metal silicate solution and an acidified solution of said metal salt to an agitated receiving medium at approximately 40 to 90° C. while maintaining the resulting medium at a pH value of approximately 5 to 8 during precipitation of said finely-divided silicates and thereafter adjusting the pH of the resulting suspension of precipitated silicate to a final pH value of about 4 to 4.5 with mineral acid.

2. Process according to claim 1 characterized by the fact that the precipitation is executed in an aqueous receiving medium by the simultaneous addition of the alkali silicate solution and the acidified metal salt solution.

3. Process according to claim 1 characterized by the fact that the acidified aqueous solution of the metal salts is used as the receiving medium; precipitation is executed with alkali silicate solution to an end pH value of about 6.5; and finally the precipitation suspension is brought to a pH value of about 4.0.

4. Process according to claim 1 characterized by the fact that an alkali silicate solution with the molar ratio $Na_2O:SiO_2=1:3.30$ and with a silica content of approximately 10 to 30 percent $SiO_2$ is used for the precipitation.

5. Process according to claim 1 characterized by the fact that the sulfates or chlorides of aluminum, magnesium and calcium are used as metal salts for the precipitation and the solution of salts is acidified with mineral acid.

6. The process of claim 1 in which the precipitate is filtered, washed and dried at temperatures above about 100° C.

7. The process of claim 1 wherein the pH is maintained during the precipitation between about 5 and about 6.5.

References Cited

UNITED STATES PATENTS

| 2,088,281 | 7/1937 | Smith | 23—110 |
| 2,204,113 | 6/1940 | Allen | 23—110 |
| 2,949,379 | 8/1960 | Boland | 106—288 |
| 3,099,570 | 7/1963 | Leech et al. | 106—288 |

EDWARD J. MEROS, Primary Examiner

U.S. Cl. X.R.

210—24; 252—455, 457